United States Patent

[11] 3,631,580

[72] Inventor William M. Swartz
 1430 W. Wrightwood Ave., Chicago, Ill. 60614
[21] Appl. No. 857,896
[22] Filed Sept. 15, 1969
[45] Patented Jan. 4, 1972

[54] METHOD OF MAKING PLASTIC ARTICLES
 5 Claims, 7 Drawing Figs.

[52] U.S. Cl............................................. 29/407,
 29/527.2, 264/257, 264/322
[51] Int. Cl............................................. B23q 17/00
[50] Field of Search............................................. 29/407,
 527.2; 264/132, 322, 257; 156/209, 219; 161/117

[56] References Cited
 UNITED STATES PATENTS
 2,205,466 6/1940 Caprio et al. ................ 156/219
 2,306,256 12/1942 Wickwire, Jr. et al. ........ 156/219
 2,670,337 2/1954 Toulmin, Jr. ................. 264/132 X
 3,200,025 8/1965 Edmondson.................. 156/209
 3,458,614 7/1969 Knoll........................... 264/132
 3,487,133 12/1969 Lindsay....................... 264/322 X

*Primary Examiner*—Charlie T. Moon
*Assistant Examiner*—Victor A. Di Palma
*Attorney*—Spector & Alster

ABSTRACT: Plastic sheets with a preprinted hot-stamped metallic area are heated and die formed. The registry and surface characteristics of the formed article are noted by using a gridded test sheet that permits the configuration and location of the hot-stamped area to be corrected. The proper surface characteristics, such as the amount of surface crackling, of the hot-stamped area are obtained by varying the amount of elongation of the sheet in the hot-stamped area during die-forming.

PATENTED JAN 4 1972
3,631,580
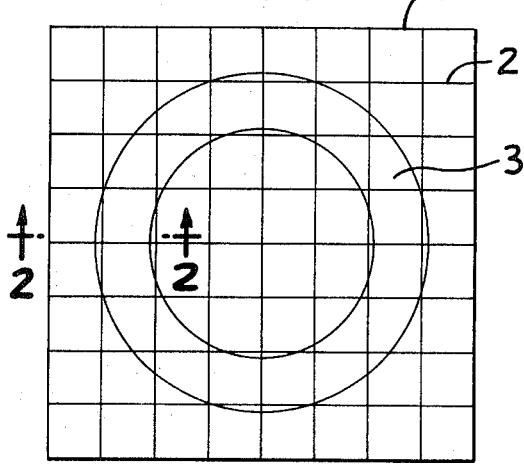
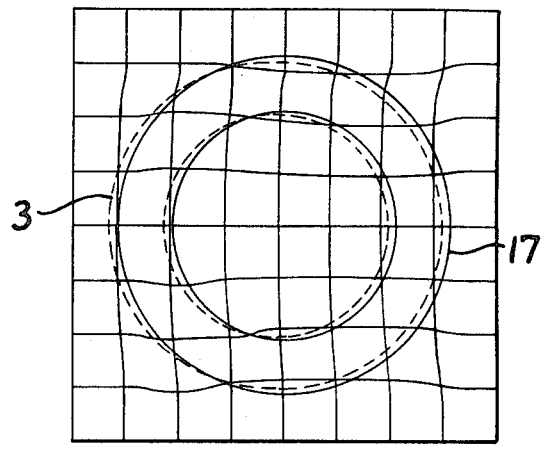
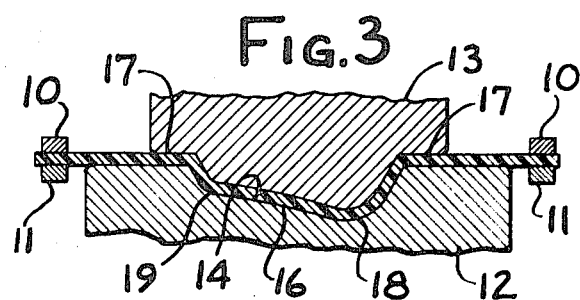
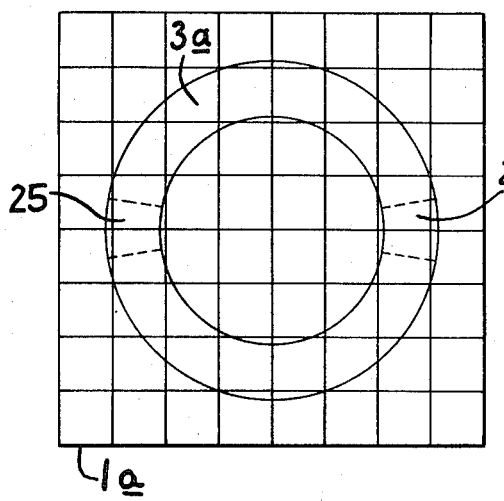
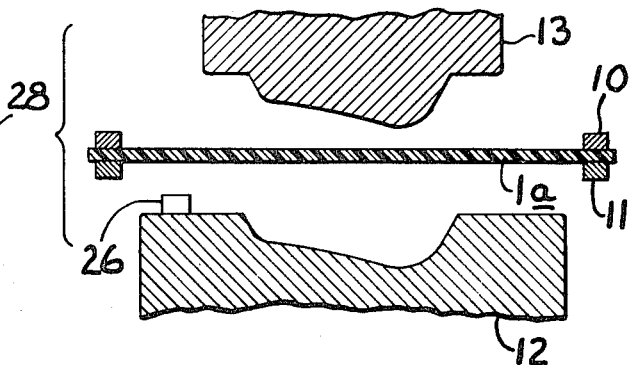
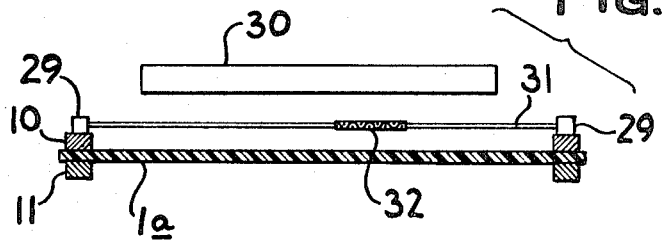
INVENTOR
WILLIAM M. SWARTZ
by: Spector & Alster
ATTYS.

METHOD OF MAKING PLASTIC ARTICLES

This invention relates to a method of making a plastic article and more particularly to the manufacture of plastic articles from preprinted plastic sheets that are heated and then die-formed to shape.

The manufacture of plastic articles by heating and die-forming preprinted plastic sheets is known. Techniques are also known for preprinting the sheet so that the preprinted areas will "register" or be properly located in the formed piece. However, one type of material which has not heretofore been considered suitable for preprinting on plastic sheets that are to be heated and die-formed is a metallic coating of the so-called "hot-stamped" type. Such metallic coating or plating is often used to give the appearance of gold or gold leaf. One common type of hot stamping material for producing a gold-appearing surface has a tape or carrier and a laminate that consists of a film of yellow lacquer on the carrier, a film of aluminum over the lacquer, a film of clear lacquer over the aluminum, and a film of heat-sensitive adhesive over the clear lacquer. The laminate is transferred to a surface by placing the heat-sensitive film against the surface to be stamped and applying a heated platen or other pressure member to the carrier so that the gold-appearing laminate will be transferred or plated onto such surface to the heated area or areas.

It has been found, however, that the preprinting and die-forming of heated plastic sheets that are hot stamped present problems not generally encountered with other preprinted materials. If the hot-stamped sheet is heated and die-formed in the usual way, the surface finish of the hot-stamped area will not necessarily produce a predictable metallic finished appearance. For instance, the metallic finish might be excessively cracked, or the finish might buckle, or it might leave splotchy lines. If a slight crackling or "antique" effect is desired, there is no certainty that, absent a consideration of the special problems of the hot-stamped areas, the desired surface characteristics will result.

It is an object of this invention to provide a method of making die-formed sheet plastic articles having a hot-stamped metallic surface or surface portion and in which the appearance of the hot-stamped surface after die-forming will produce the desired decorative effect.

It is a further object of this invention to provide a method of the type stated in which techniques are used to alter the forces that affect the surface characteristics of the hot stamping so as to control them in a predetermined manner for a particular plastic piece being formed.

The attainment of the above and further objects of this invention will be apparent from the following description taken in conjunction with the accompanying drawing forming a part thereof.

In the drawing:

FIG. 1 is a top plan view of a hot-stamped plastic test sheet used in the method of this invention;

FIG. 2 is a sectional view, on an enlarged scale, taken along 2—2 of FIG. 1;

FIG. 3 is a sectional view of FIG. 1 of an article that has been die-formed from the sheet of FIG. 1, the article being shown in the die;

FIG. 4 is a top plan view of the plastic article of FIG. 3;

FIG. 5 is a top plan view of a test sheet wherein the position or register of the hot-stamped region has been corrected but which requires correction of the surface characteristics of the hot-stamped area at a localized region thereof;

FIG. 6 is a sectional view of the sheet of FIG. 5 preparatory to die-forming and showing one way of altering the surface characteristics of the hot-stamped area; and FIG. 7 is a sectional view of the sheet and showing another way of altering the surface characteristics of the hot-stamped area. Referring now in more detail to the drawing, there is shown a test sheet 1 of plastic, such as polystyrene, having imprinted thereon, as by silk-screening, a rectangular grid 2. An area 3 of the sheet 1 is hot stamped to provide, for example, a gold appearance. The hot-stamping laminate shown enlarged in FIG. 2 consists of a heat-sensitive adhesive 5, a film of clear lacquer 6, a film of aluminum 7, and a film of clear yellow lacquer. The sheet 1 is heated in a conventional manner, as by passing the sheet through an oven, while it is held at its periphery by encircling clamp members 10, 11. Then the sheet is formed in a die 12 under the action of a pressure member or plunger 13 so that the sheet assumes the shape of the die cavity 14. In the example illustrated the annular hot-stamped area 3 is intended to be, in the molded piece 16, an annular rim portion 17 and the piece is intended to have a cavity that is deeper at one side 18 than at the other side 19, as shown in FIG. 3. The molded piece shown is, of course, by way of example only since the principles of the invention are applicable to other shaped pieces which may in whole or in part be plated with a hot-stamped metallic finish. Furthermore, while the piece 16 is shown as being pressure formed, it may also be vacuum formed.

The hot-stamped area 3 was imprinted on the sheet 1 in a shape and location which would approximately result in a molded article 16 in which the rim portion 17 (shown in full lines in FIG. 4) would coincide with the hot-stamped area 3 (shown in broken lines in FIG. 4). Generally, there is a misregister between the area at 3 and 17. Consequently, the area of the hot stamping 3 is replotted on a new grid-printed sheet 1a shown in FIG. 5. The corrections for this replotting are determined by taking the points on the full-line portion 17 as they appear with reference to the grid lines that they intersect and plotting those points onto the sheet 1a. This technique is known in the art. The corrected pattern 3a for the preprinted hot stamping would thus be the one that registers with the rim 17 of the article when it is formed in the die 12.

If conventional inks had been used for the preprinted area, the foregoing corrected pattern would ordinarily suffice to locate and shape preprinted area for the production of a run of a number of articles, using sheets which are similar to the sheet 1a but without the grid. However, the surface characteristics of the hot-stamped area may, and often will, be unsatisfactory. Therefore, merely correcting the registry of the preprinted hot-stamped area will not necessarily enable a satisfactory article to be made. The departure from the desired surface appearance may be over the entire hot-stamped surface or it may be localized. Thus, if there has been excessive elongation of the plastic sheet in the hot-stamped area during the die-forming, there will be excessive crackling of the hot-stamped film. Likewise, if there has been too little elongation of the plastic in the hot-stamped area, there may be little or no cracking of the film and there would be little or no "antiquing" effect produced. These deficiencies can, of course, both be present in different localized portions of the hot stamping.

For a given die configuration there are various corrective measures that can be utilized to produce the desired surface effect, by increasing or decreasing the stretch of the plastic, as required. For example, a different composition of plastic could be used. A plastic compounded with more or less of an elastomer would produce a sheet having greater or lesser elongation, as the case may be.

A plastic of a different strain characteristics might be used. A so-called high-strain plastic will produce more surface crackling of the hot-stamped area than will a so-called low-strain plastic.

The size and/or thickness of the plastic sheet from which the piece is formed may be varied. This will provide a greater or lesser amount, as the case may be, of plastic available for flow into the die and will thus affect the elongation upon die-forming.

The temperature and time of heating of the plastic varies the amount of sag or elongation of the plastic sheet from its holding clamps. The higher the temperature, the greater the flow, and vice versa. A colder sheet flows less evenly, especially into the low parts of the die. When the sheet is heated, it sags or relaxes and then begins to return to a taut condition. Generally, the sheet is die-formed just as the sheet begins to return to a taut condition. However, a different strain pattern or surface crackling effect may result if the sheet is die-formed at another point during the heating period.

A further corrective measure is shown in FIG. 6. Assume that in the illustrated article in a localized area (FIG. 5) near the shallow part 19 there was insufficient surface crackling of the hot-stamped area 3 in the test sheet formed as per FIG. 3 to give the desired appearance. A greater amount of crackling might be obtained by stretching the sheet in the localized region 25 during die-forming. One way of doing this is to place a block 26 on the die 12 outside of the cavity 14 and near the region 25 so that when the plunger 13 is depressed to shape the sheet there will be an increase in the elongation of the sheet in that localized region 25.

A still further corrective measure is shown in FIG. 7. Assume that in a localized area 28 near the deepest part 18 of the article the crackling is excessive. A lesser amount of stretching of the sheet in that localized area 28 may be effected by reducing the temperature of the plastic sheet 1 threreat before the die-forming takes place. This may be done by placing a frame 29 on the sheet clamps to overlie the sheet 1 as the clamped sheet passes beneath a heater 30. The frame 29 has a wire support 31 that holds a piece of screen wire 32 over the area 28 so that the screen wire 32 masks the heat from the heater 30 at the area 28. The frame 29 is removed just before the sheet is die-formed.

With one or more of the appropriate corrective measures taken, the gridded sheet of FIG. 5 is die-formed and the surface characteristics of the hot-stamped area are noted. If they are not correct, further corrective measures must be used. If the surface characteristics are acceptable, the hot-stamped area will probably be out of register since elongation of the sheet, locally or otherwise, has been changed from the original test run of FIGS. 1-3. Accordingly, the out-of-register portions of the hot-stamped area must be corrected by appropriate replotting.

The precise constructions and methods herein are shown illustrative of the principles of the invention.

What is claimed is:

1. A method of making an article comprising providing a plastic sheet having preprinted on at least a portion of a surface thereof a coating that is subject to crackling upon elongation of the sheet, comprising reshaping the coated sheet by heating it and then forming it in a die cavity to cause the coating and plastic to elongate and form a piece of predetermined shape that includes the shape of the die cavity, and during said reshaping changing the flow characteristics of the material at a fractional portion of its surface with respect to the flow characteristics of the remaining fractional part of the surface for controlling the elongation of the plastic at different portions of the coated surface, to cause the coating to have a predetermined surface appearance.

2. A method according to claim 1 in which the elongation is controlled by producing a temperature difference in the sheet in a localized area.

3. A method according to claim 1 in which the elongation is controlled by modifying the tension in the sheet in a localized area.

4. A method according to claim 1 in which the coating includes a metallic film with adhesive interposed between the film and the plastic sheet.

5. A method of making an article comprising printing on a plastic sheet a substantially rectangular grid, applying thereover a pattern that comprises a metallic coating film which is subject to crackling upon elongation of the sheet, reshaping the sheet by heating it, and then forming it in a die cavity to form a piece the shape of which is determined by the die cavity, determining the change between the grid and the metallic coating film on the die-formed piece, reapplying to a similar second rectangular gridded sheet a patterned metallic coating film that has the same relationship to the second rectangular grid that the metallic film on the die-formed piece has to the grid on the die-formed piece, and heating said second sheet and die-forming it in said die cavity, and during said last mentioned die-forming operation modifying the elongation characteristics of said second sheet over a part thereof that includes a part of said second metallic coating film.

* * * * *